United States Patent
Feki et al.

(10) Patent No.: US 10,680,705 B2
(45) Date of Patent: Jun. 9, 2020

(54) NETWORK ENTITY AND A METHOD FOR SELECTING A COMMUNICATION RELAY

(71) Applicant: HUAWEI TECHNOLOGIES CO., LTD., Shenzhen, Guangdong (CN)

(72) Inventors: Afef Feki, Munich (DE); Melissa Duarte Gelvez, Boulogne Billancourt (FR); Stefan Valentin, Boulogne Billancourt (FR); Luca Rose, Munich (DE)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 95 days.

(21) Appl. No.: 15/986,627

(22) Filed: May 22, 2018

(65) Prior Publication Data
US 2018/0278325 A1    Sep. 27, 2018

Related U.S. Application Data

(63) Continuation of application No. PCT/EP2015/077306, filed on Nov. 23, 2015.

(51) Int. Cl.
*H04B 1/60* (2006.01)
*H04B 7/26* (2006.01)
(Continued)

(52) U.S. Cl.
CPC .......... *H04B 7/2606* (2013.01); *H04W 16/18* (2013.01); *H04W 24/02* (2013.01); *H04B 7/0626* (2013.01)

(58) Field of Classification Search
None
See application file for complete search history.

(56) References Cited

U.S. PATENT DOCUMENTS 5,878,328 A * 3/1999 Chawla ................. H04W 16/18
                                                        379/27.03
5,987,328 A   11/1999 Ephremides et al.
(Continued)

FOREIGN PATENT DOCUMENTS

CN            104811948 A     7/2015

OTHER PUBLICATIONS

Meng-meng Miao et al.,"A Cross-Layer Relay Selection Algorithm for D2D Communication System",2014 International Conference on Wireless Communication and Sensor Network,total 6 pages.
(Continued)

*Primary Examiner* — Brandon M Renner
(74) *Attorney, Agent, or Firm* — Womble Bond Dickinson (US) LLP (57) ABSTRACT

The disclosure relates to a network entity for selecting a communication relay from a plurality of communication relays within the service area of a base station covering a plurality of geographic positions, wherein each communication relay is able to retransmit a communication between the base station and a user equipment, wherein the network entity comprises a divider configured to divide the service area into a plurality of different regions based on an attenuation measure at each geographic position, a determiner configured to determine for each pair of regions a spatial isolation measure based on the attenuation measures at the geographic positions within the regions, and a selector configured to select a communication relay based on the spatial isolation measures associated with the geographic position of each communication relay.

14 Claims, 8 Drawing Sheets

(51) Int. Cl.
*H04W 16/18* (2009.01)
*H04W 24/02* (2009.01)
*H04B 7/06* (2006.01)

(56) References Cited

U.S. PATENT DOCUMENTS

| | | | | |
|---|---|---|---|---|
| 2009/0111376 A1* | 4/2009 | Kim | H04B 7/2606 | 455/9 |
| 2012/0044836 A1* | 2/2012 | Sivavakeesar | H04W 24/02 | 370/255 |
| 2013/0343346 A1* | 12/2013 | Chen | H04W 72/082 | 370/332 |
| 2014/0269318 A1* | 9/2014 | Hasarchi | H04B 7/024 | 370/235 |

OTHER PUBLICATIONS

Berna Sayrac et al.,"Radio Environmental Maps (REMs):A Cognitive Tool for Environmental Awareness",Orange Labs http://www-syscom.univ-m1v.fr/~najim/gdr-ecoradio/sayrac.pdf,total 30 pages.
Phee Lep Yeoh et al.,"Transmit Antenna Selection for Interference Management in Cognitive Relay Networks",IEEE Transactions on Vehicular Technology, vol. 63, No. 7, Sep. 2014,total 13 pages.
Nan Yang et al.,"Transmit Antenna Selection for Security Enhancement in MIMO Wiretap Channels",IEEE Transactions on Communications, vol. 61, No. 1, Jan. 2013,total 11 pages.
Sang-Woon Jeon et al.,"A Survey on Interference Networks: Interference Alignment and Neutralization",Entropy 2012, 14, 1842-1863; doi:10.3390/e14101842,total 22 pages.
Pablo Arbelaez et al.,"Contour Detection and Hierarchical Image Segmentation", http://www.cs.berkeley.edu/~arbelaez/publications/amfm_pami2011.pdf,total 20 pages.
Berna Sayrac (FT) et al.,"Flexible and Spectrum Aware Radio Access through Measurements and Modelling in Cognitive Radio Systems",Document No. D2.4,Final System Architecture,Dec. 31, 2011,total 100 pages.
Lefei Wang et al.,"Interference Constrained Relay Selection of D2D Communication for Relay Purpose Underlaying Cellular Networks",Wireless Communications, Networking and Mobile Computing (WiCOM), 2012 8th International Conference on , vol., No., pp. 1,5, Sep. 21-23, 2012,total 5 pages.
Jinlong Cao et al.,"Interference-aware Multi-user Relay Selection Scheme in Cooperative Relay Networks",Globecom 2013 Workshop—Broadband Wireless Access,total 6 pages.
Dawoon Lee et al.,"Low-Complexity Interference-Aware Single Relay Selection in Multi-Source Multi-Destination Cooperative Networks",Signal Processing and Communication Systems (ICSPCS), 2012 6th International Conference on , vol., No., pp. 1,5, Dec. 12-14, 2012,total 5 pages.
A. Eisenblatter H.-F, Geerdes T. Koch, U. Turke, "Momentum Data Scenarios for Radio Network Planning and Simulation", https://opus4.kobv.de/opus4-zib/files/782/ZR-04-07.pdf,total 8 pages.
Si Wen et al.,"Optimization of Interference Coordination Schemes in Device-to-Device(D2D) Communication",2012 7th International ICST Conference on Communications and Networking in China (CHINACOM),total 6 pages.

* cited by examiner

|    | R1 | R2 | R3 | R4 | R5 |
|----|----|----|----|----|----|
| R1 | $\alpha_{1,1}$ | $\alpha_{1,2}$ | $\alpha_{1,3}$ | $\alpha_{1,4}$ | $\alpha_{1,5}$ |
| R2 | $\alpha_{1,2}$ | $\alpha_{2,2}$ | $\alpha_{2,3}$ | $\alpha_{2,4}$ | $\alpha_{2,5}$ |
| R3 | $\alpha_{3,1}$ | $\alpha_{3,2}$ | $\alpha_{3,3}$ | $\alpha_{3,4}$ | $\alpha_{3,5}$ |
| R4 | $\alpha_{4,1}$ | $\alpha_{4,2}$ | $\alpha_{4,3}$ | $\alpha_{4,4}$ | $\alpha_{4,5}$ |
| R5 | $\alpha_{5,1}$ | $\alpha_{5,2}$ | $\alpha_{5,3}$ | $\alpha_{5,4}$ | $\alpha_{5,5}$ |

NETWORK ENTITY AND A METHOD FOR
SELECTING A COMMUNICATION RELAY

CROSS-REFERENCE TO RELATED
APPLICATIONS

This application is a continuation of International Application No. PCT/EP2015/077306, filed on Nov. 23, 2015, the disclosure of which is incorporated herein by reference in its entirety.

TECHNICAL FIELD

The present disclosure relates to wireless communication. More specifically, the present disclosure relates to a network entity capable of selecting a communication relay from a plurality of communication relays and a method of operating such a network entity.

BACKGROUND

In relay assisted communication, relay nodes are deployed to forward information between a transmitter and a receiver. Different use cases can be identified for relay-assisted communication. The most popular are coverage extension, where a relay extends the coverage of a given base station, and traffic offload, and the base station can offload a part of its traffic to a relay for the relay to buffer and forward packets to a set of target users.

Co-channel interference is a critical problem regarding relay links using the same radio resources. 3GPP standardized Type I and II relays solve this problem using orthogonal resources for transmissions between the base station and the relays. However, this leads to a multiplexing loss that reduces the total network capacity.

In order to reduce the interference generated by in-band relay communication, different approaches are described in the literature. Usually, relay selection is combined with power control, sub-band allocation (see, for instance Jeon et al. "A survey on interference networks: Interference alignment and neutralization." Entropy, vol. 14, no. 10, pp. 1842-1863, 2012) or transmit antenna selection (see, for instance Yang, Nan, et al. "Transmit antenna selection for security enhancement in MIMO wiretap channels." IEEE Transactions on Communications, vol. 61, no. 1. pp. 144-154, 2013) in order to meet given interference constraints.

This selection can be formulated as an optimization problem to maximize a utility function, for example the average sum rate. In Lee et al. "Low-complexity interference-aware single relay selection in multi-source multi-destination cooperative networks." 6th International Conference on Signal Processing and Communication Systems (ICSPCS), IEEE, 2012 the relay selection decision is formulated as an assignment problem, modeled as a weighted bipartite graph, and solved by the Hungarian algorithm. The algorithm input can be a channel state information (CSI) as for instance described in Cao, Jinlong, et al. "Interference-aware multi-user relay selection scheme in cooperative relay networks." Globecom Workshops (GC Wkshps), IEEE, 2013. In Miao et al. "A Cross-Layer Relay Selection Algorithm for D2D Communication System." International Conference on Wireless Communication and Sensor Network (WCSN), IEEE, 2014, an additional input, queue state information (QSI), is required.

However, the aforementioned approaches share two key disadvantages. Firstly, they require instantaneous channel knowledge, typically CSI, which leads to signaling costs and problems linked to outdated channel knowledge, and secondly, the approaches are characterized by high computational complexity mainly due to the necessity of solving large optimization problems in real time.

It is difficult to decrease the interference drawback without orthogonalizing the transmission and to efficiently select a relay, in such a way that the total interference level does not impact the network capacity in a destructive way.

SUMMARY OF THE INVENTION

It is an object of the disclosure to provide a network entity and a method of operating a network entity implementing an improved relay selection technique.

The foregoing and other objects are achieved by the subject matter of the independent claims. Further implementation forms are apparent from the dependent claims, the description and the figures.

According to one aspect, the disclosure relates to a network entity for selecting a communication relay from a plurality of communication relays within the service area of a base station covering a plurality of geographic positions, wherein each communication relay is able to retransmit the communication between the base station and a user equipment, wherein the network entity comprises a divider configured to divide the service area into a plurality of different regions based on an attenuation measure at each geographic position of the service area, a determiner configured to determine, for each pair of regions in the service area, a spatial isolation measure based on the attenuation measures at the geographic positions within the regions, and a selector configured to select a communication relay from the plurality of communication relays based on the spatial isolation measures associated with the geographic position of each communication relay of the plurality of communication relays.

This provides the advantage that the communication relay can be selected efficiently by the network entity based on geographic features of the service area and without having instantaneous channel knowledge of all communication channels between the plurality of communication relays and the user equipment or the base station.

The plurality of communication relays can be potential communication relays which are currently not relaying or retransmitting the communication between the base station and the user equipment or between the base station and another user equipment. Furthermore the plurality of communication relays can include user equipments.

The spatial isolation measure (e.g., $\alpha_{i,j}$) can be a degree of attenuation of radio waves between two geographical regions i and j of the plurality of different regions in the service area. In one embodiment, the attenuation measure at each geographic position of the service area is a measured or computed path loss of the communication from the geographic position to the base station.

In another embodiment, the attenuation measure at each geographic position is computed as a function of one or several of the following values: a height parameter, an indicator of indoors or outdoors, a specific measurement obtained during the operation of the radio access network, in particular a channel state information (CSI), a channel quality indicator (CQI), or a received signal strength indicator (RSSI).

In yet another embodiment, the determiner is configured to determine the spatial isolation measure for each pair of regions based on an average of the attenuation measures within each region of the pair of regions and an average of the attenuation measures of regions which are located in-between the pair of regions. The determiner can also be configured to determine the spatial isolation measure for each pair of regions based on a function of the attenuation measures within each region of the pair of regions and/or a function of the attenuation measures of regions which are located in-between the pair of regions, wherein the functions can be the average of the respective attenuation measures.

For two neighboring regions i and j, the spatial isolation measure $\alpha_{i,j}$ can be directly obtained from measuring the attenuation between a transmitter in region i and a receiver in region j or vice versa. Such measures can be obtained from drive tests or during the operation of the wireless network in the deployments where user devices communicate directly with each other.

In cases where the user devices communicate only via a base station, as in most cellular networks, the spatial isolation measure can be obtained indirectly. One such measurement method is to define the spatial isolation measure $\alpha_{i,j}=|L_i-L_j|$, wherein $L_i$ and $L_j$ are path losses averaged over all discrete positions within the neighboring region i and j, respectively. For two regions, which are not direct neighbors, the path loss in the intermediate region is taken into account, when calculating $\alpha_{i,j}$, for example:

$$\alpha_{i,j} = \left| \frac{1}{M}\sum_{m=1}^{M} L_m - L_i \right| + \left| \frac{1}{M}\sum_{m=1}^{M} L_m - L_j \right|, \quad (1)$$

wherein $L_m$ (with m=1, . . . , M) are the average path losses in the spatially isolated regions that are intermediate to $L_i$ and $L_j$, and M is the number of regions between region i and region j.

The average path loss values L can be obtained from typical channel measurements such as drive tests or direct terminal measurements, which are commonly performed by network monitoring functions, as standardized in "Universal Terrestrial Radio Access (UTRA) and Evolved Universal Terrestrial Radio Access (E-UTRA); Radio Measurement Collection for Minimization of Drive Tests (MDT); Overall Description; Stage 2", 3GPP Standard TS 37.320, v. 12.0.0, September 2014.

In still another embodiment, the determiner is configured to store the determined spatial isolation measures for each pair of regions in a look-up-table.

In another embodiment, the determiner is configured to determine a relay isolation measure for each communication relay of the plurality of communication relays based on the spatial isolation measures associated with the geographic position of each communication relay, wherein the selector is configured to select the communication relay of the plurality of communication relays with the highest relay isolation measure.

The relay isolation measure $I_k$ for a communication relay k which is, for instance, located in the geographic region $R_4$ with adjacent geographic regions $R_2$, $R_3$, and $R_5$ can be calculated according to: $I_k=\frac{1}{3}$ $(\alpha_{4,2}+\alpha_{4,3}+\alpha_{4,5})$, wherein $\alpha_{4,2}$, $\alpha_{4,3}$, and $\alpha_{4,5}$ are the spatial isolation measures between regions $R_4$ and $R_2$, $R_4$ and $R_3$, and $R_4$ and $R_5$, respectively. If other regions, for instance $R_1$, are not adjacent to $R_4$ they can be neglected for the calculation of $I_k$.

In yet another embodiment, the network entity comprises a memory to store the look-up-table, and wherein the determiner is configured to determine the relay isolation measure for each communication relay of the plurality of potential communication relays based on the stored spatial isolation measures. Furthermore, the geographic position of the user equipment and/or the base station and/or each relay of the plurality of relays can be stored in the memory.

In still another embodiment, the determiner is configured to determine a set of communication relays among the plurality of communication relays based on the geographic position of the communication relays, and the geographic position of the user equipment or the geographic position of the base station, wherein the determiner is further configured to restrict the determination of the relay isolation measure to the set of communication relays. This achieves the advantage that relay isolation measures have to be calculated for only a limited amount of communication relays.

The set of communication relays can comprise all communication relays whose distance to the user equipment is smaller than a first predetermined distance threshold, or whose distance to the base station is smaller than a second predetermined distance threshold. Furthermore, the set of communication relays can comprise the $N_{UE}$ communication relays of the plurality of communication relays that are closest to the user equipment, or the $N_{BS}$ communication relays of the plurality of communication relays that are closest to the base station, wherein $N_{UE}$ and $N_{BS}$ can be predetermined numbers.

In another embodiment, the selector is configured to select the communication relay of the plurality of communication relays with the highest relay isolation measure among the communication relays whose distance to the user equipment is smaller than a predetermined threshold. This achieves the advantage that a selection of communication relays with high relay isolation measure but also high distances to the user equipment can be avoided.

In yet another embodiment, the network entity comprises an assigner, wherein the assigner is configured to assign the user equipment to the selected communication relay of the plurality of communication relays for communicating with the base station.

In still another embodiment, the divider is configured to divide the service area into the plurality of different regions based on a geographic map of the service area, in particular a radio map of the service area, which comprises the attenuation measures.

The geographic map can be stored as a pixel image, wherein the attenuation measure at each pixel can be a color or a brightness at the respective pixel, and wherein the divider can be configured to identify the different regions by applying image processing techniques, in particular image segmentation and/or contour detection, to the geographic map. The geographic map, in particular the pixel image, can be stored in the memory.

In another embodiment, the network entity comprises a receiver configured to receive, in particular periodically receive, an updated geographic map of the service area. This achieves the advantage that the network entity can take geographic changes in the service area into account when selecting the communication relay. For instance, the divider can be configured to, after receiving the updated geographic map, divide the service area into the plurality of different regions based on the attenuation measures in the updated geographic map. In yet another embodiment, the base station comprises the network entity.

According to another aspect, the disclosure relates to a method for selecting a communication relay from a plurality of communication relays within the service area of a base station covering a plurality of geographic positions, wherein each communication relay is able to retransmit the communication between the base station and a user equipment, wherein the method comprises dividing the service area into a plurality of different regions based on an attenuation measure at each geographic position of the service area, determining for each pair of regions in the service area a spatial isolation measure based on the attenuation measure, and selecting a communication relay from the plurality of communication relays based on the spatial isolation measures associated with the geographic position of each communication relay of the plurality of communication relays. Besides the spatial isolation measures associated with the geographic position, the communication relay can be selected based on other communication criteria which are related to the communication between the base station and the user equipment.

The method according to another aspect of the disclosure can be performed by the network entity according to one aspect of the disclosure. Further features of the method according to another aspect of the disclosure result directly from the functionality of the network entity according to one aspect of the disclosure and its different implementation forms.

According to yet another aspect, the disclosure relates to a computer program comprising program code for performing the method according to another aspect of the disclosure when executed on a computer.

The disclosure can be implemented in hardware and/or software.

BRIEF DESCRIPTION OF THE DRAWINGS

Further embodiments of the invention will be described with respect to the following figures, in which.

DETAILED DESCRIPTION OF EMBODIMENTS OF THE INVENTION

In the following detailed description, reference is made to the accompanying drawings, which form a part of the disclosure, and in which are shown, by way of illustration, specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that a disclosure in connection with a described method may also hold true for a corresponding device or system configured to perform the method and vice versa. For example, if a specific method operation is described, a corresponding device may include a unit to perform the described method operation, even if such unit is not explicitly described or illustrated in the figures. Further, it is understood that the features of the various exemplary aspects described herein may be combined with each other, unless specifically noted otherwise.

Figure 1:
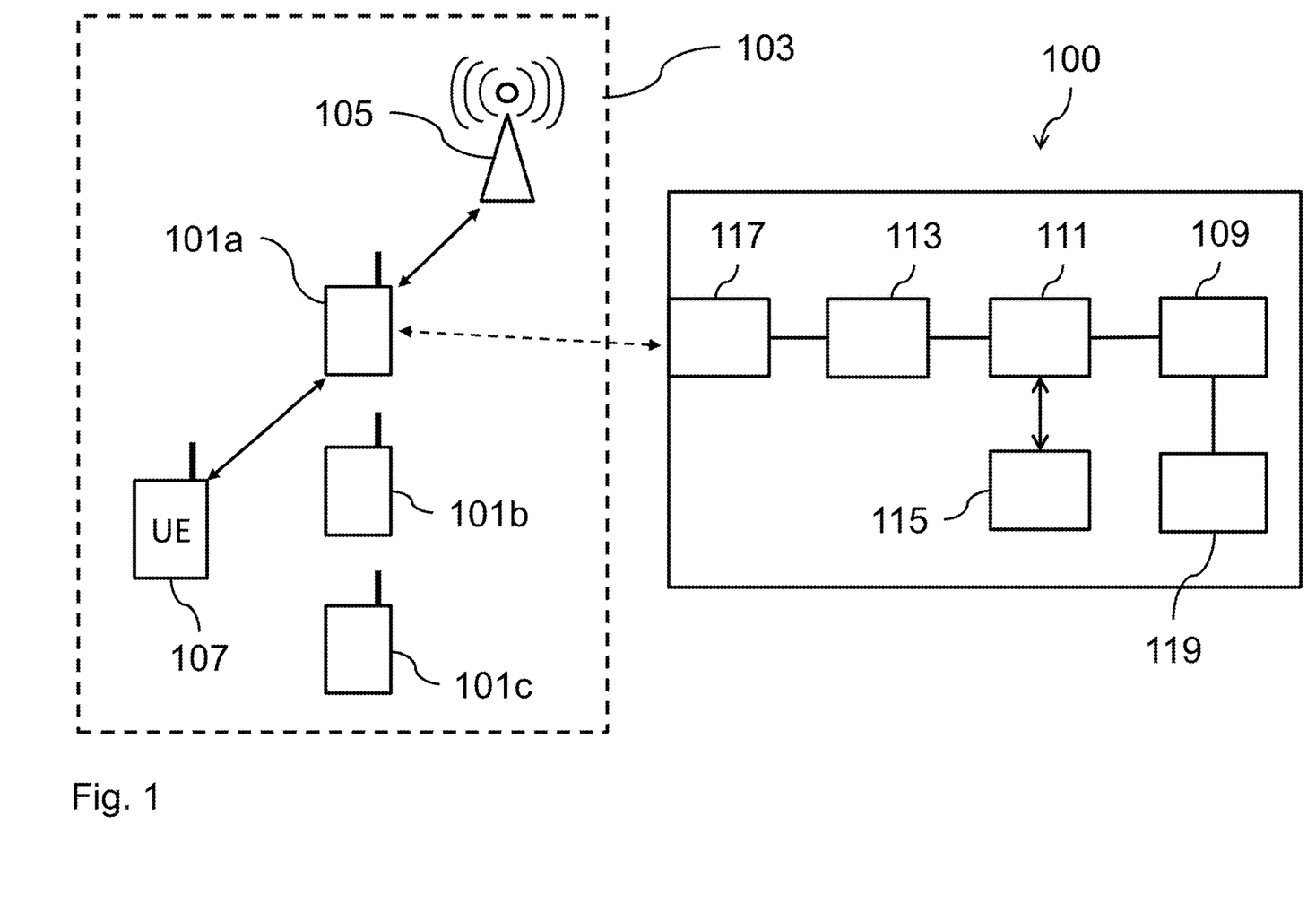
FIG. 1 shows a schematic diagram of a network entity according to an embodiment.

FIG. 1 shows a schematic diagram of a network entity 100 for selecting a communication relay 101a from a plurality of communication relays 101a-c within the service area 103 of a base station 105 according to an embodiment.

The base station 105 can cover a plurality of geographic positions. Each communication relay 101a-c can be configured to retransmit the communication between the base station 105 and a user equipment 107.

The network entity 100 comprises a divider 109 configured to divide the service area 103 into a plurality of different regions based on an attenuation measure at each geographic position of the service area 103, a determiner 111 configured to determine for each pair of regions in the service area 103 a spatial isolation measure based on the attenuation measures at the geographic positions within the regions, and a selector 113 configured to select a communication relay 101a from the plurality of communication relays 101a-c based on the spatial isolation measures associated with the geographic position of each communication relay of the plurality of communication relays 101a-c.

The communication relay 101a can be selected efficiently by the network entity 100 based on geographic features of the service area 103 without having instantaneous channel knowledge of all communication channels between the plurality of communication relays 101a-c and the user equipment 107 or the base station 105.

The plurality of communication relays 101a-c can be potential communication relays which are currently not relaying respectively retransmitting the communication between the base station 105 and the user equipment 107 or between the base station 105 and another user equipment. Furthermore, the plurality of communication relays 101a-c can be further user equipments.

The spatial isolation measure ($\alpha_{i,j}$) can be a degree of attenuation of radio waves between two geographical regions i and j of the plurality of different regions in the service area 103.

In the exemplary scenario shown in FIG. 1, the network entity 100 comprises a memory 115, an assigner 117 and a receiver 119.

In an embodiment, the attenuation measure at each geographic position of the service area 103 is a measured or computed path loss of the communication from the geographic position to the base station 105. In an embodiment, the attenuation measure at each geographic position is computed as a function of one or several of the following values: a height parameter, an indicator of indoors or outdoors, a specific measurement obtained during the operation of the radio access network, in particular a CSI, a CQI, or a RSSI.

In an embodiment, the determiner 111 is configured to determine the spatial isolation measure for each pair of regions based on an average of the attenuation measures within each region of the pair of regions and an average of the attenuation measures of regions which are located in-between the pair of regions.

For two neighboring regions i and j, the spatial isolation measure $\alpha_{i,j}$ can be directly obtained from measuring the attenuation between a transmitter in region i and a receiver in region j and vice versa. Such measures can be obtained from drive tests or during the operation of the wireless network in the deployments where user devices communicate directly with each other.

In case the user devices communicate only via a base station, as in most cellular networks, the spatial isolation measure $\alpha_{i,j}$ can be only obtained indirectly. One such method is to define the spatial isolation measure $\alpha_{i,j}=|L_i-L_j|$, wherein $L_i$ and $L_j$ are defined as path losses averaged over all discrete positions within the neighboring region i and j, respectively. For two regions, which are not direct neighbors, the path loss in the intermediate region is taken into account, when calculating $\alpha_{i,j}$, according to:

$$\alpha_{i,j} = \left| \frac{1}{M} \sum_{m=1}^{M} L_m - L_i \right| + \left| \frac{1}{M} \sum_{m=1}^{M} L_m - L_j \right|, \quad (2)$$

wherein $L_m$ (with m=1, ..., M) are the average path losses in the spatially isolated regions that are intermediate to $L_i$ and $L_j$ and M is the number of regions between region i and region j. The average path loss values L can be obtained from typical channel measurements such as drive tests or direct terminal measurements, which are commonly performed by network monitoring functions, as standardized in "Universal Terrestrial Radio Access (UTRA) and Evolved Universal Terrestrial Radio Access (E-UTRA); Radio Measurement Collection for Minimization of Drive Tests (MDT); Overall Description; Stage 2", 3GPP Standard TS 37.320, v. 12.0.0, September 2014. Equation 1 and equation 2 can be identical.

In an embodiment, the determiner 111 is configured to store the determined spatial isolation measures for each pair of regions in a look-up-table. In an embodiment, the determiner 111 is configured to determine a relay isolation measure for each communication relay of the plurality of communication relays 101a-c based on the spatial isolation measures associated with the geographic position of each communication relay 101a-c, wherein the selector 113 is configured to select the communication relay 101a of the plurality of communication relays 101a-c with the highest relay isolation measure.

The relay isolation measure $I_k$ for a communication relay k which is, for instance, located in the geographic region $R_4$ with adjacent geographic regions $R_2$, $R_3$, $R_5$ can be calculated according to: $I_k=\frac{1}{3}(\alpha_{4,2}+\alpha_{4,3}+\alpha_{4,5})$, wherein $\alpha_{4,2}$, $\alpha_{4,3}$, and $\alpha_{4,5}$ are the spatial isolation measures between regions $R_4$ and $R_2$, $R_4$ and $R_3$, and $R_4$ and $R_5$, respectively. If other regions, for instance $R_1$, are not adjacent to $R_4$ they can be neglected for the calculation of $I_k$.

In an embodiment, the network entity 100 comprises the memory 115 to store the look-up-table, wherein the determiner 111 is configured to determine the relay isolation measure for each communication relay of the plurality of communication relays 101a-c based on the stored spatial isolation measures.

Furthermore, the geographic position of the user equipment 107 and/or the base station 105 and/or each relay of the plurality of relays 101a-c can be stored in the memory 115.

In an embodiment, the determiner 111 is configured to determine a set of communication relays among the plurality of communication relays 101a-c based on the geographic position of the communication relays 101a-c, and the geographic position of the user equipment 107 or the geographic position of the base station 105, wherein the determiner 111 is further configured to restrict the determination of the relay isolation measure to the set of communication relays.

The set of communication relays can comprise all communication relays whose distance to the user equipment 107 is smaller than a first predetermined distance threshold, or whose distance to the base station 105 is smaller than a second predetermined distance threshold. Furthermore, the set of communication relays can comprise the $N_{UE}$ communication relays of the plurality of communication relays 101a-c that are closest to the user equipment 107, or the $N_{BS}$ communication relays of the plurality of communication relays 101a-c that are closest to the base station 105, wherein $N_{UE}$ and $N_{BS}$ can be predetermined numbers.

In an embodiment, the selector 113 is configured to select the communication relay 101a of the plurality of communication relays 101a-c with the highest relay isolation measure among the communication relays whose distance to the user equipment 107 is smaller than a predetermined threshold.

Thus, a selection of a communication relay with high relay isolation measure but also high distances to the user equipment 107 can be avoided.

In an embodiment, the determiner 111 is configured to determine a path loss measure of a communication path between the user equipment 107 and each potential communication relay 101a-c, based on the attenuation measure at each geographic position of the service area 103 in a line-of-sight between the user equipment 107 and the respective communication relay 101a-c.

In an embodiment, the determiner 111 is configured to determine the ratio of the relay isolation measure to the path loss measure from each communication relay 101a-c to the user equipment 107, wherein the selector 113 is configured to select the communication relay 101a of the plurality of communication relays 101a-c that minimizes this ratio.

In an embodiment, the assigner 117 is configured to assign the user equipment 107 to the selected communication relay 101a of the plurality of communication relays 101a-c for communicating with the base station 105.

In an embodiment, the divider 109 is configured to divide the service area 103 into the plurality of different regions based on a geographic map of the service area 103, in particular a radio map of the service area 103, which comprises the attenuation measures.

The geographic map can be stored as a pixel image, wherein the attenuation measure at each pixel can be a color or a brightness at the respective pixel, and wherein the divider 109 can be configured to identify the different regions by applying image processing techniques, in particular image segmentation and/or contour detection, to the geographic map. The geographic map, in particular the pixel image, can be stored in the memory 115.

In an embodiment, the receiver 119 is configured to receive, in particular periodically receive, an updated geographic map of the service area 103. Thus, the network entity 100 can take geographic changes in the service area 103 into account when selecting the communication relay 101a. For instance, the divider 109 can be configured to, after receiving the updated geographic map, divide the service area 103 into the plurality of different regions based on the attenuation measures in the updated geographic map.

In an embodiment, the base station 105 comprises the network entity 100.

Figure 2:
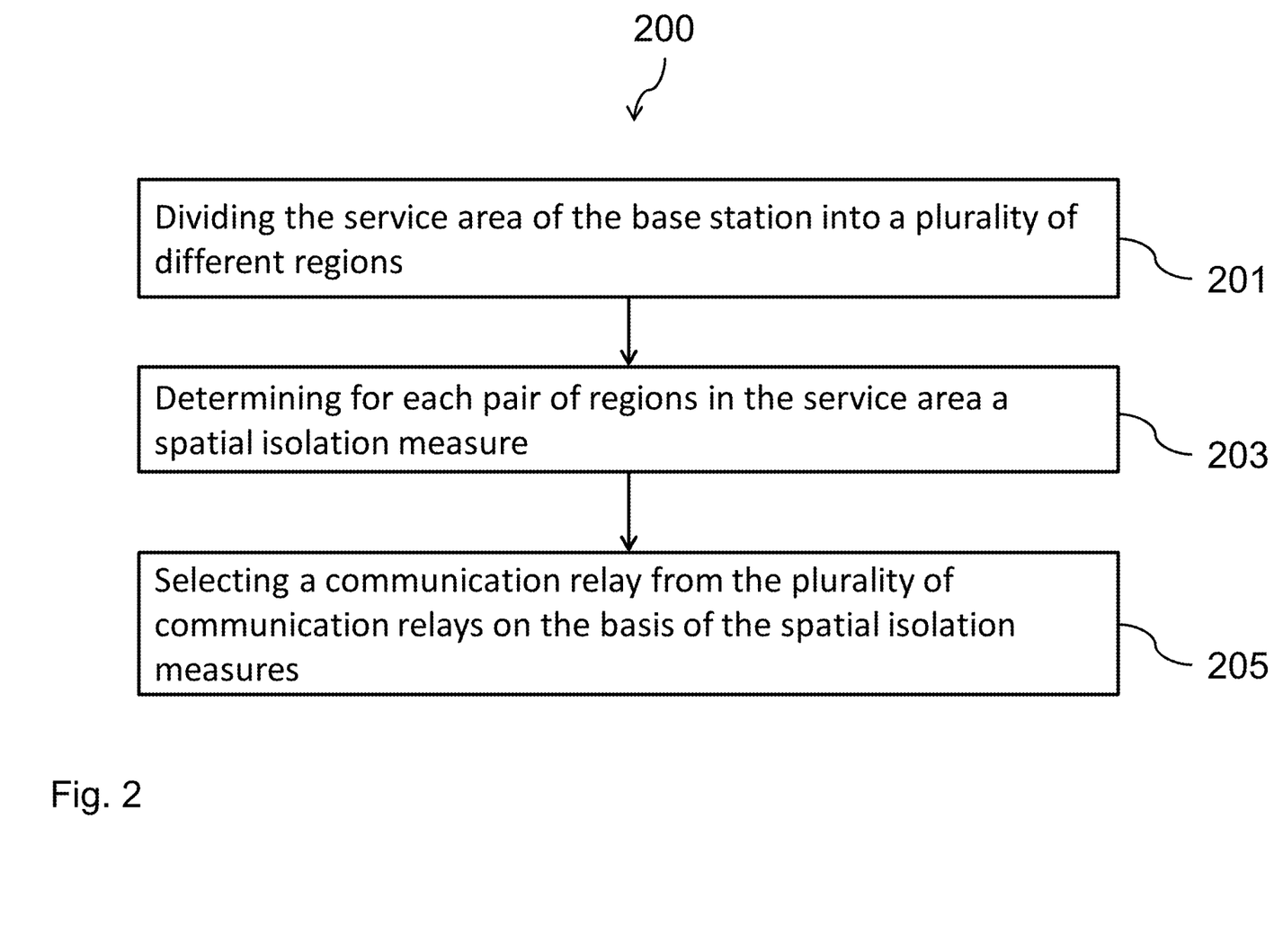
FIG. 2 shows a schematic diagram of a method for selecting a communication relay from a plurality of communication relays according to an embodiment.

FIG. 2 shows a schematic diagram of a method 200 for selecting the communication relay 101a from the plurality of communication relays 101a-c within the service area 103 of the base station 105 covering the plurality of geographic positions according to an embodiment.

Each communication relay 101a-c can be configured to retransmit the communication between the base station 105 and the user equipment 107.

The method comprises operation 201 of dividing the service area 103 into the plurality of different regions based on the attenuation measure at each geographic position of the service area 103, operation 203 of determining for each pair of regions in the service area 103 the spatial isolation measure based on the attenuation measure, and operation 205 of selecting the communication relay 101a from the plurality of communication relays 101a-c based on the spatial isolation measures associated with the geographic position of each communication relay of the plurality of communication relays 101a-c. In one embodiment, the method 200 can be performed by the network entity 100.

In the following, further implementation forms, embodiments and aspects of the network entity 100 and the method 200 will be described.

Figure 3:
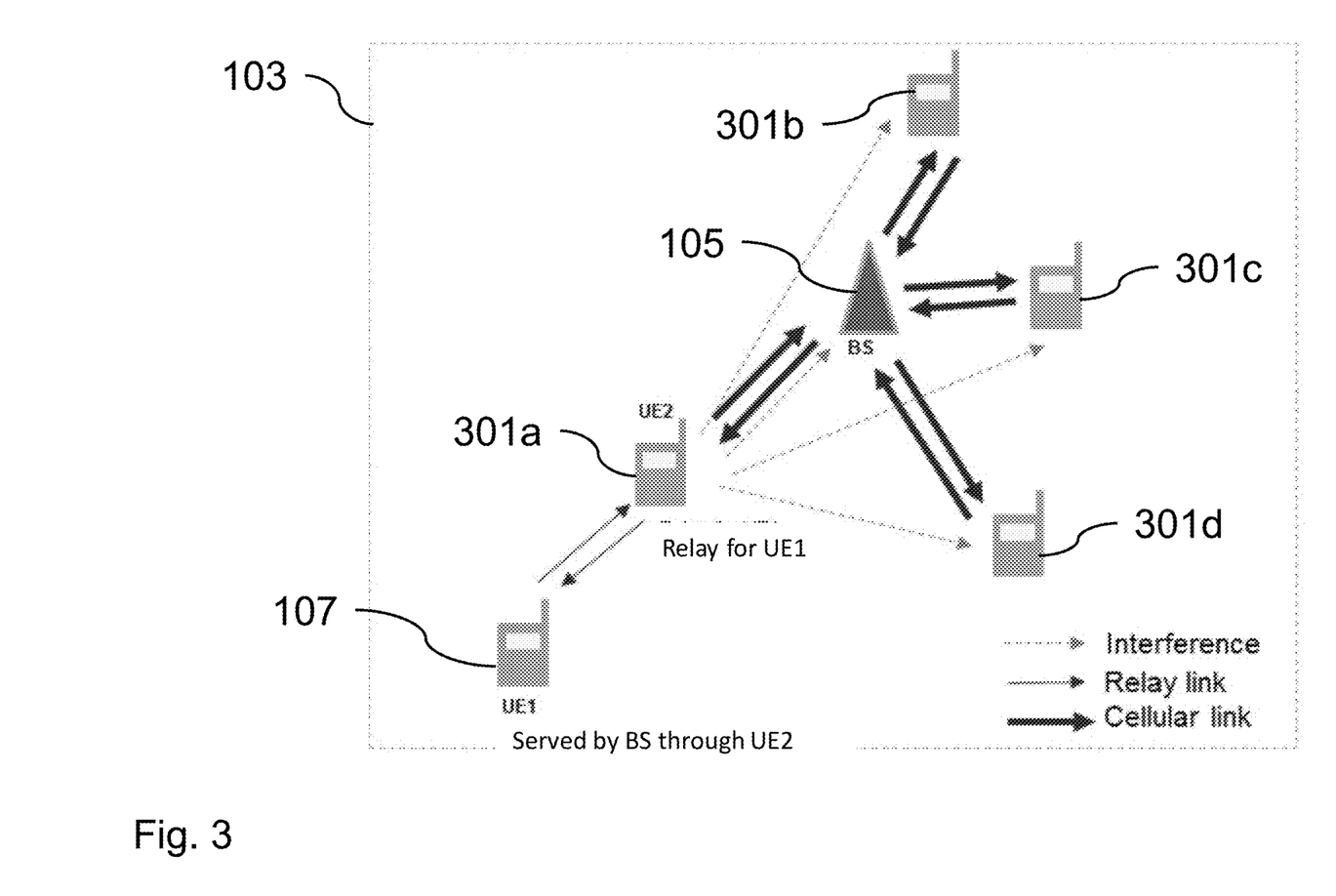
FIG. 3 shows a schematic diagram of a service area of a base station according to an embodiment.

FIG. 3 shows a schematic diagram of the service area 103 of the base station 105 according to an embodiment, wherein the plurality of communication relays in the service area 103 are user equipments 301a-d.

In the example scenario shown in FIG. 3, the user equipment 107 is served by the base station 105 through the user equipment 301a. Thus, increasing a transmitted power of the base station 105 to reach the user equipment 107 can be avoided. The coverage of the base station 105 can be extended by the user equipments 301a-d in its service area 103 which can function as communication relays.

Figure 4A:
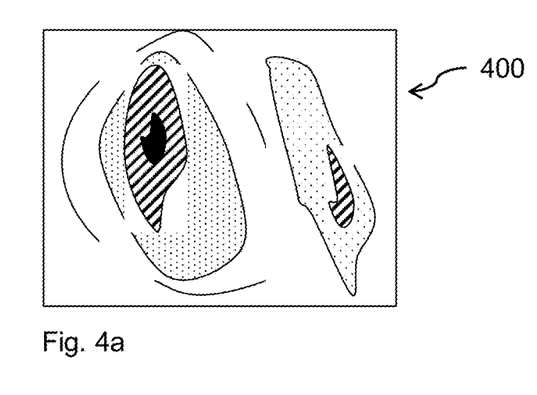
FIGS. 4a-d show schematic diagrams of a radio map according to an embodiment.

FIGS. 4a-d show schematic diagrams of the radio map 400 according to an embodiment. FIG. 4a shows an initial radio map 400 which can contain geographic and/or topographic information of a geographic area, for instance height information at each geographic position of the geographic area. This radio map 400 can be divided into different geographic regions (R1, R2, R3, R4, and R5), wherein each geographic region represents a geographical area that is spatially isolated from the other geographical regions. In the exemplary scenario shown in FIG. 4b the initial radio 400 map is divided into the different regions R1 to R5.

Figure 4B:
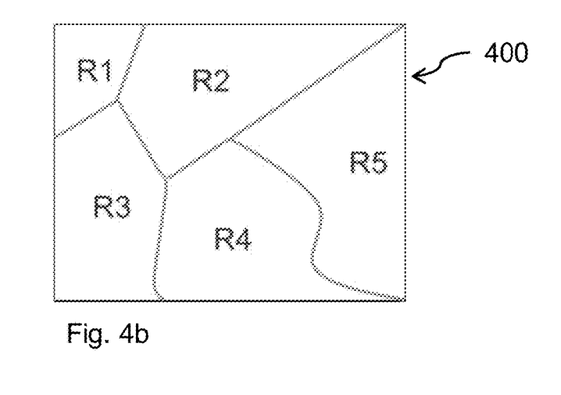

The spatial isolation measure α corresponds to a significant path loss difference across the region boundaries. The path loss difference between two regions can, for instance, be caused by a gap in the path loss values within the boundaries of the regions. The significant path loss difference between different regions can indicate a spatial isolation. This spatial isolation can be due to geographical properties of the terrain, for instance the presence of buildings.

The radio map 400 can be stored in the network entity 100 in the form of an image, in particular a pixel image. The geographic regions (R1, R2, R3, R4, R5) can be obtained by image processing techniques, for instance image segmentation and/or contour detection. In the pixel image 400, pixels with darker color can correspond to higher path loss values and pixels with brighter color can correspond to lower path loss values.

Figure 4C:
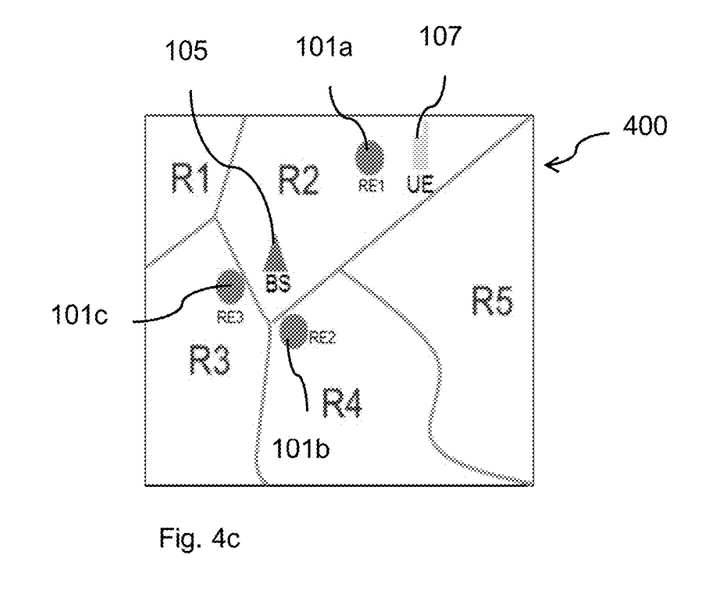

In the exemplary scenario shown in FIG. 4c, the geographic positions of the base station 105, the plurality of relays 101a-c and the user equipment 107 are registered in the radio map 400. The base station 105, the plurality of relays 101a-c and the user equipment 107 are located in different geographic regions of the radio map 400.

In an embodiment, the determiner 111 is configured to determine a set of feasible communication relays (SOFR) among the plurality of communication relays 101a-c based on the geographic position of the communication relays 101a-c, and the geographic position of the user equipment 107 or the geographic position of the base station 105. The determiner 111 can be further configured to restrict the determination of the relay isolation measure to the SOFR.

In general, many nodes respectively relays can serve as relay for the user equipment 107. Determining the SOFR reduces this potential large set of relays to a smaller set. We present hereafter some example for the SOFR.

Figure 4D:
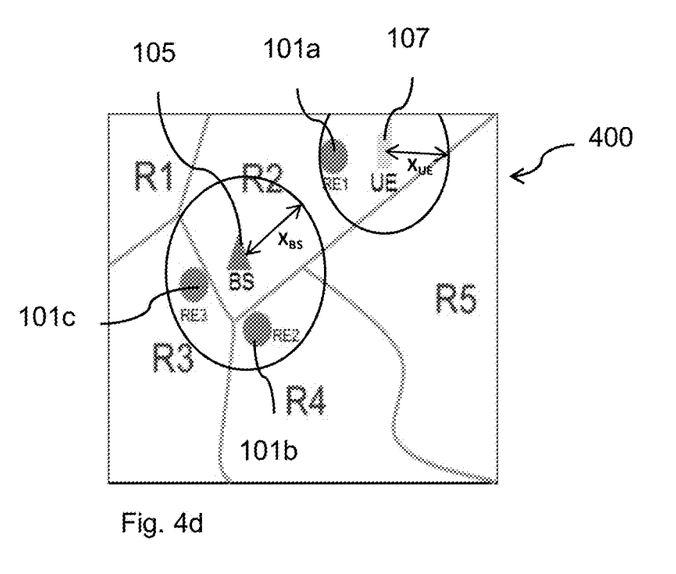

The SOFR can include all relays that are within $x_{BS}$ meters from the BS or within $x_{UE}$ meters from the user equipment 107, wherein $x_{BE}$ and $x_{UE}$ are predetermined numbers. The number $x_{UE}$ can be the first predetermined distance threshold and the number $x_{BS}$ can be the second predetermined distance threshold.

In the exemplary scenario shown in FIG. 4d, $x_{BE}$ is marked for the base station 105 and $x_{UE}$ is marked for the user equipment 107.

In an embodiment, the SOFR includes the $N_{BS}$ communication relays that are closest to the base station 105 and the $N_{UE}$ communication relays that are closest to the user equipment 107.

A communication relay 101a of the plurality of communication relays 101a-c can be selected based on the SOFR and the isolation measure $I_k$ which can be computed by the determiner 111.

If $I_k$ is above a predetermined isolation threshold, one of the following selection criteria can be applied by the selector 113 to select the communication relay 101a:

(i) The selector 113 can be configured to select the relay of the SOFR with the largest isolation measure $I_k$.

(ii) The selector 113 can be configured to select the relay of the SOFR with the largest isolation measure $I_k$ among the relays that are within $x_{UE}$ meters from the user equipment 107. The distance can provide a tie breaker strategy: If there is more than one relay with the largest isolation factor, the relay closest to the user equipment 107 can be chosen.

(iii) The determiner 111 can be configured to determine a path loss measure $L_{mk}$ of a communication path between the user equipment m 107 and each potential communication relay k 101a-c, based on the attenuation measure at each geographic position of the service area 103 in a line-of-sight between the user equipment 107 and the respective communication relay 101a-c.

Figure 5A:
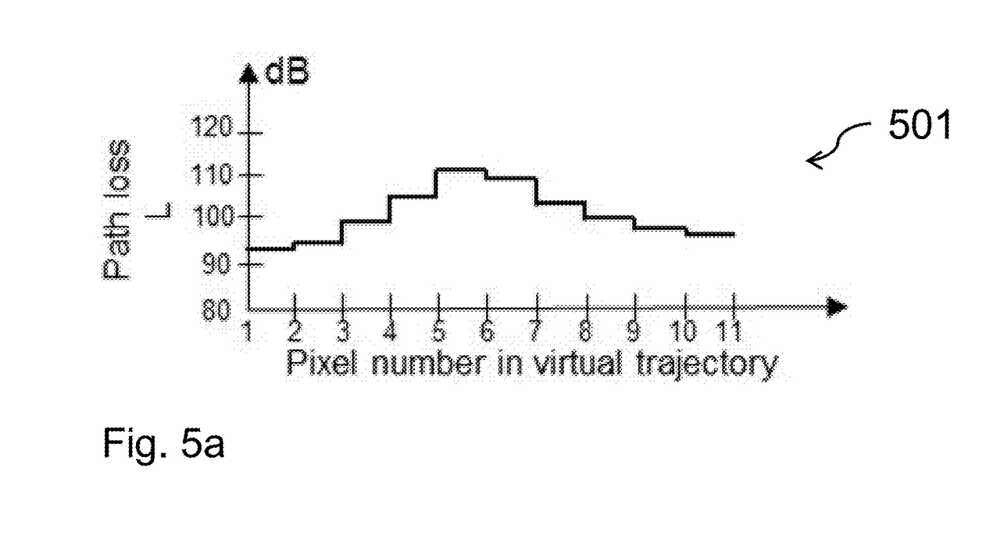
FIG. 5a shows a diagram of a path loss according to an embodiment.
Figure 5B:
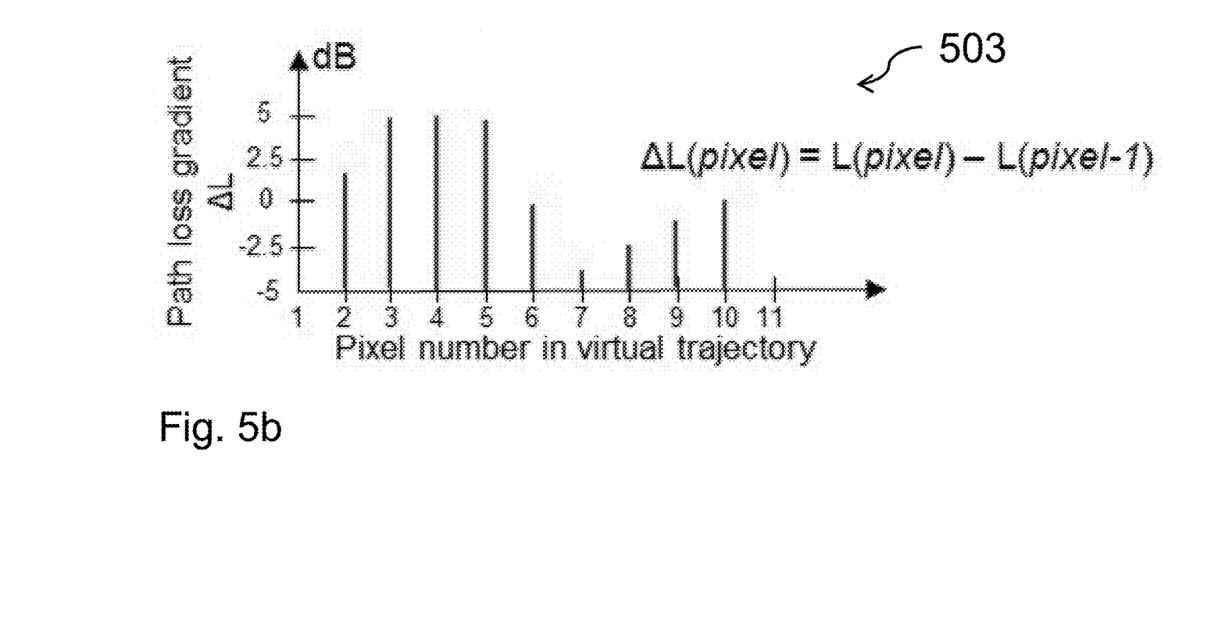
FIG. 5b shows a diagram of a path loss gradient according to an embodiment.

FIG. 5a and FIG. 5b show a diagram 501 of the computed path loss L and a diagram 503 of the path loss gradient ΔL according to an embodiment. In the example scenario shown in FIG. 5a and FIG. 5b, the path loss and the path loss gradient were calculated for eleven pixels of the radio map 400.

The determiner 111 can be further configured to determine the ratio of the relay isolation measure $I_k$ to the path loss measure $L_{mk}$ from communication relay k to the user equipment m 107 for each potential communication relay 101a-c, and the selector 113 can be configured to select the communication relay 101a of the plurality of communication relays 101a-c that minimizes the ratio. The determiner can be configured to determine the path loss measure $L_{mk}$ based on the path losses L between the communication relay k and the user equipment m 107, or based on the path loss gradient ΔL between the communication relay k and the user equipment m 107.

Figure 6:
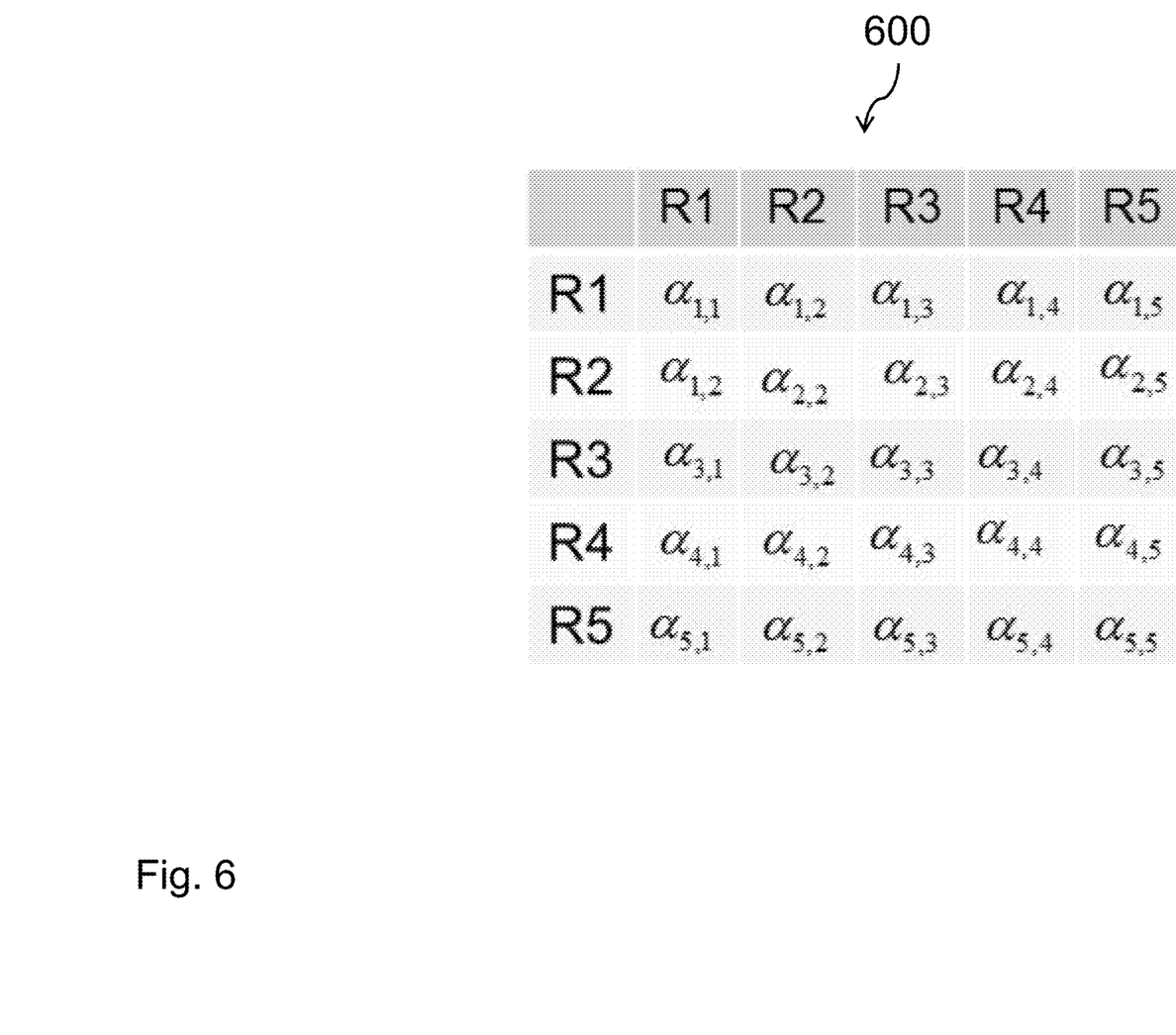
FIG. 6 shows a look-up-table according to an embodiment.

FIG. 6 shows the look-up-table 600 according to an embodiment. In the exemplary scenario shown in FIG. 6, the look-up-table 600 stores the spatial isolation measures $\alpha_{i,j}$ between the geographic regions R1, R2, R3, R4, and R5.

Figure 7:
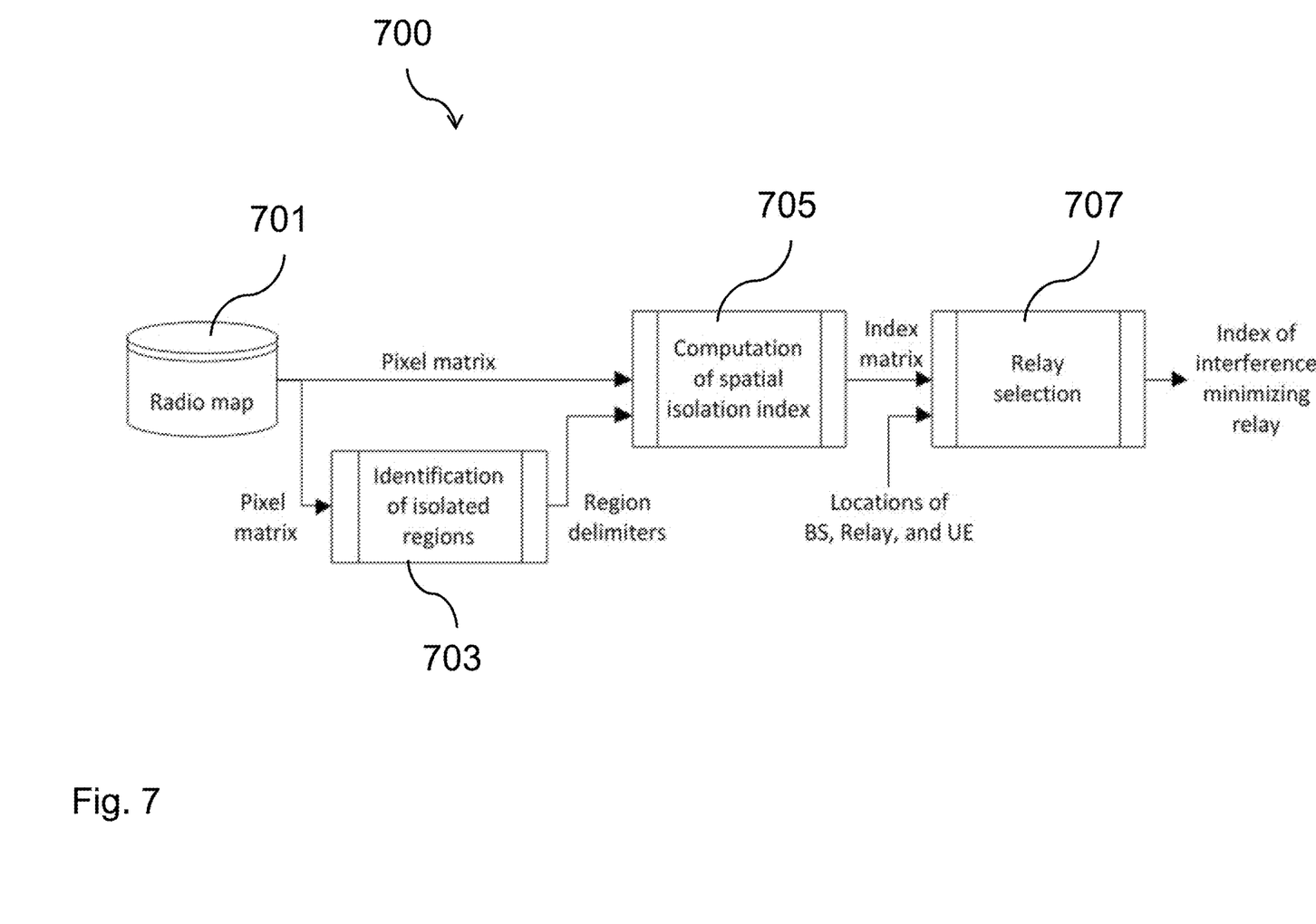
FIG. 7 shows a schematic diagram of a method for map-aware relay selection according to an embodiment.

FIG. 7 shows a schematic diagram of a method 700 for map-aware relay selection (MARS). The method 700 corresponds to a communication relay selection algorithm that minimizes the in-band relay generated interference by exploiting radio maps 400 and location information.

The method 700 comprises operation 701 of analyzing the radio map 400 and location information of the base station 105 and the user equipment 107, operation 703 of identifying geographic regions that are electromagnetically isolated, in terms of the received or generated interference level, operation 705 of computing the spatial isolation measure that indicates the interference level between the identified regions, operation 707 of selecting a communication relay 101a using the spatial isolation measure, the regions associated to the communication relay 101a and the location of the user equipment 107.

Radio maps 400, location of the communication relays 101a-c, the user equipment 107 and the base station 105 and other context information can help to find electromagnetically isolated areas. A communication relay 101a in these areas can have minimal interference to the cellular links. The network entity 100 can identify these areas, be aware of the locations of the communication relays 101a-c and assign communication relays within these areas such that the interference with the cellular network is minimized.

With this method, spatial multiplexing can be enhanced by selecting communication relays 101a-c according to propagation characteristics extracted from the radio map 400. In particular, the spatial isolation of geographic areas which provides a measure for the interference between regions in which transmitters may operate. By selecting communication relays 101a-c according to this information, interference between the transmitters can be minimized, or equivalently, spatial multiplexing can be maximized. No instantaneous CSI knowledge is required for this approach. In addition, the use of low complexity processing for communication relay selection is enabled. The method 700 can be performed by the network entity 100.

Figure 8:
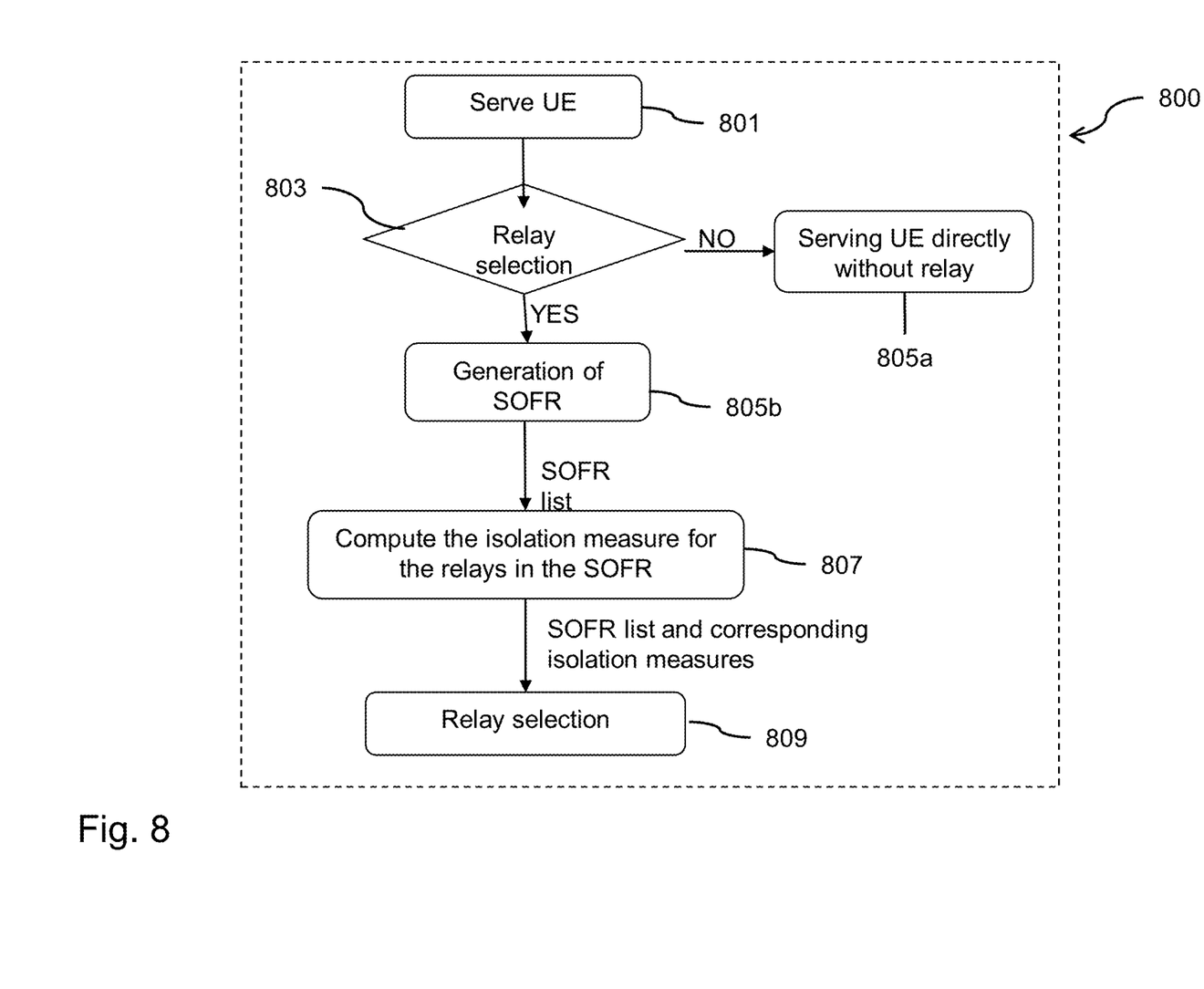
FIG. 8 shows a schematic diagram of a method for relay selection based on a set of feasible relays according to an embodiment.

FIG. 8 shows a schematic diagram of a method 800 for relay selection based on the set of feasible relays (SOFR). The method 800 comprises operation 801 of identifying the user equipment 107 that is served by the base station 105, operation 803 of determining whether a communication relay is required for the communication between the identified user equipment 107 and the base station 105, either operation 805a of directly serving the user equipment 107 if no relay is required for the communication or operation 805b of generating the SOFR if a relay is required for the communication, operation 807 of determining the relay isolation measure for each communication relay 101a-c of the SOFR, and operation 809 of selecting a communication relay of the SOFR based on the relay isolation measure. The method 800 can be performed by the network entity 100.

The goal of methods 200, 700 and 800 is to prioritize relaying in geographic regions that are spatially isolated, hence exploiting geographical isolation to reduce the interference level of a communication link. This reduced interference can lead to higher data rates of the relay-assisted communication, higher data rates in neighboring cells, and a simplified selection of relays.

More specifically, the benefit of this interference reduction can be directly expressed as a high improvement of the transmission rate. Denoting the used channel bandwidth as W and the number of orthogonal transmissions as K, a transmission rate for direct relaying $R_d$ and for conventional relaying $R_{cr}$ can be described. Different approaches can be used to calculate $R_d$ and $R_{cr}$, for instance:

(i) For a direct link from BS to UE:

$$R_d = W \log_2(1+\text{SINR}_d), \quad (3)$$

wherein $\text{SINR}_d$ is the Signal-to-Noise Ratio for direct relaying.

(ii) For conventional relaying under half-duplex constraint, i.e., with 3GPP Type I and II relays:

$$R_{cr} = \frac{W}{K} \log_2(1 + SINR_{cr}), \quad (4)$$

wherein $\text{SINR}_{cr}$ is the Signal-to-Noise Ratio for conventional relaying.

(iii) For relaying with spatial multiplexing, as enabled by the methods 200, 700 and 800:

$$R_{cr} = W \log_2(1+\text{SINR}_{cr}). \quad (5)$$

(iv) For a more general case of relaying with spatial multiplexing, as enabled by the methods 200, 700 and 800:

$$R_{cri} = \frac{W}{N} \log_2(1 + SINR_{cr}), \quad (6)$$

where $N \in [1, K]$ depending on the spatial isolation, and N=1 for perfect spatial isolation and K for no spatial isolation.

Due to diversity gains: $\text{SINR}_{cr} > \text{SINR}_d$. Consequently, $R_{cr} > R_d$ and $R_{cri} > R_d$, which means that the transmission rate increases strongly as soon as spatial isolation can be realized.

Improving relay selection can be relevant for device-to-device (D2D) communication, which consist of end-user devices establishing direct communication links. This can be exploited by the base station 105 as communication relays 101a-c can be used either to extend the coverage area of the base station 105, or to offload the network in heavy traffic situations. In the former case, the base station 105 can select efficiently the relay 101a between large numbers of possible communication relays 101a-c, with no further overhead. While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. A network entity for selecting a communication relay from a plurality of communication relays within a service area of a base station covering a plurality of geographic positions, wherein each communication relay is able to retransmit a communication between the base station and a user equipment, wherein the network entity comprises:
    a processor; and
    a non-transitory computer-readable storage medium coupled to the processor and storing a program for execution by the processor, the program including instructions to:
    divide the service area into a plurality of different regions based on an attenuation measure at each geographic position of the service area;
    determine, for each pair of regions in the service area, a spatial isolation measure based on the attenuation measures at the geographic positions within the regions; and
    select a communication relay from the plurality of communication relays based on the spatial isolation measures associated with the geographic position of each communication relay of the plurality of communication relays;
    wherein the program further includes instructions to determine the spatial isolation measure for each pair of regions based on an average of the attenuation measures within each region of the pair of regions and an average of the attenuation measures of regions which are located between the pair of regions.

2. The network entity of claim 1, wherein the attenuation measure at each geographic position of the service area is a measured or computed path loss of a communication of a user equipment from the geographic position to the base station.

3. The network entity of claim 1, wherein the attenuation measure at each geographic position is computed as a function of one or several of the following values: a height parameter, an indicator of indoors or outdoors, a measurement obtained during the operation of the radio access network including: a channel state information (CSI), a channel quality indicator (CQI), or a received signal strength indicator (RSSI).

4. The network entity of claim 1, wherein the program further includes instructions to store the determined spatial isolation measures for each pair of regions in a look-up table.

5. The network entity of claim 1, wherein the program further includes instructions to determine a relay isolation measure for each communication relay of the plurality of communication relays based on the spatial isolation measures associated with the geographic position of each communication relay, wherein the program further includes instructions to select the communication relay of the plurality of communication relays with the highest relay isolation measure.

6. The network entity of claim 4, wherein the network entity comprises a memory to store the look-up-table, and wherein the program further includes instructions to determine the relay isolation measure for each communication relay of the plurality of communication relays based on the stored spatial isolation measures.

7. The network entity of claim 5, wherein the program further includes instructions to determine a set of communication relays among the plurality of communication relays based on the geographic position of the communication relays, and the geographic position of the user equipment or the geographic position of the base station, wherein the program further includes instructions to restrict the determination of the relay isolation measure to the set of communication relays.

8. The network entity of claim 5, wherein the program further includes instructions to select the communication relay of the plurality of communication relays with the highest relay isolation measure among the communication relays whose distance to the user equipment is within a predetermined threshold.

9. The network entity of claim 1, wherein the program further includes instructions to assign the user equipment to the selected communication relay of the plurality of communication relays for communicating with the base station.

10. The network entity of claim 1, wherein the program further includes instructions to divide the service area into the plurality of different regions based on a geographic map of the service area, in particular a radio map of the service area, which comprises the attenuation measures.

11. The network entity of claim 10, wherein the program further includes instructions to periodically receive an updated geographic map of the service area.

12. The network entity of claim 1, wherein the base station comprises the network entity.

13. A method for selecting a communication relay from a plurality of communication relays within a service area of a base station covering a plurality of geographic positions, wherein each communication relay is able to retransmit a communication between the base station and a user equipment, wherein the method comprises:
    dividing the service area into a plurality of different regions based on an attenuation measure at each geographic position of the service area;
    determining for each pair of regions in the service area a spatial isolation measure based on the attenuation measure; and
    selecting a communication relay from the plurality of communication relays based on the spatial isolation measures associated with the geographic position of each communication relay of the plurality of communication relays;
    wherein the method further comprises determining the spatial isolation measure for each pair of regions based on an average of the attenuation measures within each region of the pair of regions and an average of the attenuation measures of regions which are located between the pair of regions.

14. A non-transitory machine-readable medium having instructions stored therein, which when executed by one or more processors, cause the one or more processors to perform operations, the operations comprising:
- dividing a service area into a plurality of different regions based on an attenuation measure at each geographic position of the service area;
- determining for each pair of regions in the service area a spatial isolation measure based on the attenuation measure; and
- selecting a communication relay from the plurality of communication relays based on the spatial isolation measures associated with the geographic position of each communication relay of the plurality of communication relays;
- wherein the operations further comprising:
- determining the spatial isolation measure for each pair of regions based on an average of the attenuation measures within each region of the pair of regions and an average of the attenuation measures of regions which are located between the pair of regions.

* * * * *